W. T. ELLIS.
GAGE WHEEL FOR CORN PLANTERS.
APPLICATION FILED AUG. 9, 1909.
940,382.
Patented Nov. 16, 1909.
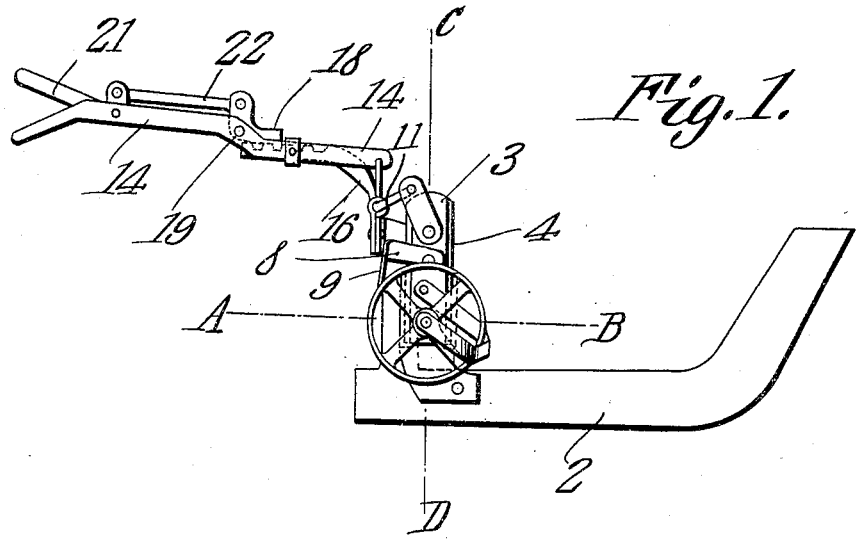
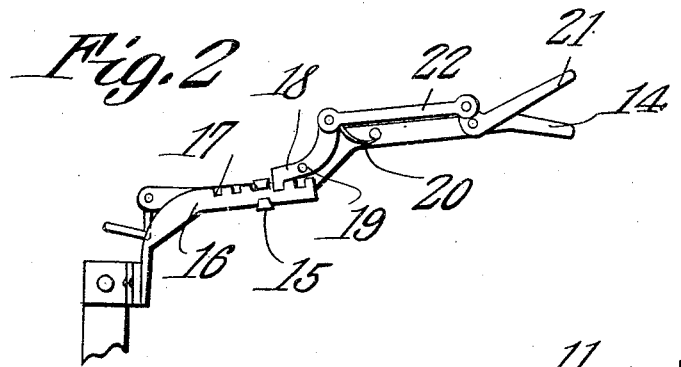
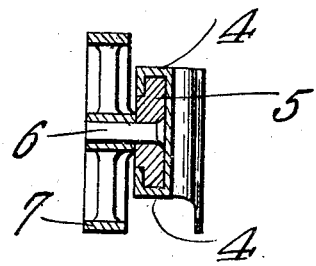
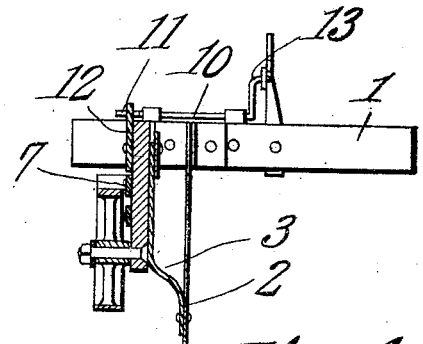
Witnesses
William T. Ellis, Inventor
By C. A. Snow & Co.
Attorneys

UNITED STATES PATENT OFFICE.

WILLIAM T. ELLIS, OF WESTON, OHIO.

GAGE-WHEEL FOR CORN-PLANTERS.

940,382.  Specification of Letters Patent.  Patented Nov. 16, 1909.

Application filed August 9, 1909. Serial No. 511,953.

*To all whom it may concern:*

Be it known that I, WILLIAM T. ELLIS, a citizen of the United States, residing at Weston, in the county of Wood and State of Ohio, have invented a new and useful Gage-Wheel for Corn-Planters, of which the following is a specification.

This invention relates to gage wheels such as used for regulating the depths of furrows.

The object of the invention is to provide a wheel of this type which is mounted in a novel manner, improved means being employed whereby the said wheel can be quickly shifted to any desired elevation relative to the furrow opener.

With these and other objects in view, the invention consists in certain novel details of construction and the combinations of parts such as hereinafter more fully described and pointed out in the claims.

In the accompanying drawing the preferred form of the invention has been shown.

In said drawing:—Figure 1 is a side elevation of a gage embodying the present improvements. Fig. 2 is an elevation of the side of the operating mechanism opposite to that shown in Fig. 1. Fig. 3 is a section on line A—B, Fig. 1, said section being on an enlarged scale. Fig. 4 is a section on line C—D, Fig. 1.

Referring to the figures by characters of reference, 1 designates a portion of the frame of a planter, there being a runner or furrow opener 2 arranged therebelow. A standard 3 extends upward from this furrow opener and is provided along its longitudinal edges with guide cleats or flanges 4 between which is mounted a slide 5. This slide has a stud 6 projecting laterally therefrom and on which is journaled a gage wheel 7. An arm 8 may be pivotally connected to the slide and has a scraper blade 9 at one end thereof which normally rests by gravity upon the wheel. A shaft 10 is journaled upon the frame 1 and has a crank 11 at one end which is connected by means of a link 12 to the slide 5. Another crank 13 is formed at the other end of shaft 10 and engages one end of an actuating bar 14. A yoke 15 is secured to this bar and straddles and is slidably mounted upon a curved guide strip 16. Notches 17 are formed within the top of the guide strip and any one of them is designed to be engaged by a dog 18. This dog is pivoted on the bar 14, as indicated at 19 and a spring 20 serves to hold it normally in engagement with the guide strip. An actuating lever 21 is pivotally mounted on bar 14 and is connected by a link 22 to the dog 18. When it is desired to shift the gage wheel, the lever 21 is actuated so as to pull on the dog 18 and disengage it from guide strip 16. By then pushing or pulling on the bar 14 the yoke 15 can be caused to slide on the strip 16 and the shaft 10 will therefore be rocked and will transmit motion through link 12 to slide 5. By releasing lever 21, the spring 20 can return the dog 18 into engagement with the strip 16 and thus lock the slide and the gage wheel against movement relative to the frame 1.

It is to be understood of course, that various changes may be made in the construction and arrangement of the parts without departing from the spirit or sacrificing the advantages of the invention.

What is claimed is:—

1. The combination with a furrow opener, of a standard, a slide guided thereon, a gage wheel movable with the slide, a rock shaft, a link connection between said shaft and the slide, a crank arm extending from the rock shaft, an arcuate toothed guide strip, an actuating bar slidable along said guide strip, said bar being pivotally connected to the crank arm, and means carried by the bar for engaging the teeth on the strip to lock the bar and strip against relative movement.

2. The combination with a furrow opener, of a standard, a slide guided on the standard, a gage wheel movable with the slide, a rock shaft, cranks thereon, a link connection between one of the cranks and the slide a curved guide strip having teeth thereon, an actuating bar, a yoke secured thereto and slidably mounted upon the guide strips, said bar pivotally engaging one of the cranks, and means carried by the bar for engaging the notched strip to hold the bar and strip against relative movement, said bar being shiftable in the direction of the length of the guide strip to actuate the rock shaft and the slide.

In testimony that I claim the foregoing as my own, I have hereto affixed my signature in the presence of two witnesses.

WILLIAM T. ELLIS.

Witnesses:
 FRED M. HILL,
 WM. W. HILL.